(12) United States Patent  (10) Patent No.: US 8,654,205 B2
Ito  (45) Date of Patent: Feb. 18, 2014

(54) MEDIUM STORING IMAGE PROCESSING PROGRAM AND IMAGING APPARATUS

(75) Inventor: Yuichi Ito, Tokyo (JP)

(73) Assignee: Nikon Corporation, Tokyo (JP)

( * ) Notice: Subject to any disclaimer, the term of this patent is extended or adjusted under 35 U.S.C. 154(b) by 351 days.

(21) Appl. No.: 12/957,764

(22) Filed: Dec. 1, 2010

(65) Prior Publication Data

US 2011/0199507 A1 Aug. 18, 2011

(30) Foreign Application Priority Data

Dec. 17, 2009 (JP) .................................. 2009-286061
Jun. 16, 2010 (JP) .................................. 2010-137201

(51) Int. Cl.
*H04N 5/235* (2006.01)
*H04N 5/225* (2006.01)
*G06K 9/72* (2006.01)

(52) U.S. Cl.
USPC ....................................... 348/222.1; 382/229

(58) Field of Classification Search
USPC ........ 348/208.4, 208.13, 211.1–211.3, 222.1, 348/271–273, 333.11; 382/162, 254
See application file for complete search history.

(56) References Cited

U.S. PATENT DOCUMENTS

| 5,541,653 | A | 7/1996 | Peters et al. |
| 7,764,848 | B2 * | 7/2010 | Ida et al. ........................ 382/299 |
| 7,868,923 | B2 * | 1/2011 | Watanabe et al. ........... 348/222.1 |
| 8,369,649 | B2 * | 2/2013 | Nagumo ........................ 382/275 |
| 2002/0001409 | A1 | 1/2002 | Chen et al. |
| 2006/0038891 | A1 * | 2/2006 | Okutomi et al. ........... 348/222.1 |
| 2009/0080806 | A1 | 3/2009 | Tanaka et al. |
| 2010/0002949 | A1 | 1/2010 | Tanaka et al. |

FOREIGN PATENT DOCUMENTS

| JP | A-2001-245314 | 9/2001 |
| JP | A-2006-245677 | 9/2006 |
| JP | A-2008-109375 | 5/2008 |
| JP | B2-4126378 | 5/2008 |
| JP | A-2009-147830 | 7/2009 |

OTHER PUBLICATIONS

Japanese Office Action dated Feb. 14, 2012 issued in Japanese Patent Application No. 2009-286061 (with translation).
Sep. 17, 2013 Office Action issued in Japanese Patent Application No. 2010-137201 (with English Translation).

* cited by examiner

*Primary Examiner* — Trung Diep
(74) *Attorney, Agent, or Firm* — Oliff PLC

(57) ABSTRACT

A storage medium storing an image processing program in which the image processing program obtains a plurality of images and displacement information indicating a positional displacement between the plurality of images, calculates weighting information for performing weighting processing on the displacement information for each of a plurality of color components, performs the weighting processing on the displacement information for each of the plurality of color components, calculates a pixel value of a color component of a calculation target based on local inflection information of a color component other than the color component of the calculation target and the weighting information after conducting the weighting processing, and generates a composite image based on a calculation result. Accordingly, it is possible to reduce a processing time in image processing which generates, from the plurality of images having the positional displacement, the composite image having a higher resolution than those images.

8 Claims, 9 Drawing Sheets

MEDIUM STORING IMAGE PROCESSING PROGRAM AND IMAGING APPARATUS

CROSS REFERENCE TO RELATED APPLICATIONS

This application is based upon and claims the benefit of priorities from Japanese Patent Application Numbers 2009-286061 (filed on Dec. 17, 2009) and 2010-137201 (filed on Jun. 16, 2010), the entire contents of which are incorporated herein by reference.

BACKGROUND

1. Field

The present application relates to a medium storing an image processing program and an imaging apparatus.

2. Description of the Related Art

There has been conventionally performed image processing for generating a composite image with relatively high resolution from a plurality of images having a positional displacement. In such image processing, there are employed various techniques using repeating processing and the like. For instance, the application of Japanese Patent No. 4126378 discloses so-called (reconstruction-based) super-resolution processing.

Incidentally, the aforementioned image processing has a problem such that a processing time is prolonged because of the repeating processing. Therefore, it is required to reduce the time taken for the image processing.

SUMMARY

Accordingly, the present application has been made in view of the above-described problems, and a proposition thereof is to reduce a processing time in image processing for generating, from a plurality of images having a positional displacement, a composite image having a higher resolution than those images.

A storage medium according to one aspect is the storage medium storing an image processing program causing a computer to execute image processing which generates, from a plurality of images formed of a plurality of color components and having a positional displacement, a composite image having a higher resolution than the plurality of images, the image processing program including an obtaining step obtaining the plurality of images and positional displacement information indicating the positional displacement between the plurality of images; a first calculating step calculating, for each of the plurality of color components, weighting information for performing weighting processing on the positional displacement information; a second calculating step performing, for each of the plurality of color components, the weighting processing based on the weighting information on the positional displacement information and calculating a pixel value of a color component of a calculation target based on local inflection information of a color component other than the color component of the calculation target among the plurality of color components and the weighting information after conducting the weighting processing; and a generating step generating the composite image based on a calculation result obtained by the second calculating step.

Note that in the first calculating step, the weighting information may also be calculated based on a predetermined reference pixel value and a color difference between the reference pixel value and an actual pixel value.

Further, in the first calculating step, the weighting information may also be calculated based on a predetermined reference coordinate value and a distance between the reference coordinate value and an actual coordinate value.

Further, in the obtaining step, a plurality of images in Bayer arrangement may also be obtained as the plurality of images.

Further, in the obtaining step, a plurality of interpolation-processed images may also be obtained as the plurality of images.

Further, it is also possible to further include a super-resolution processing step performing super-resolution processing which conducts predetermined repeating calculation by using the composite image generated in the generating step as an initial image to generate an image having a higher definition than the composite image.

An imaging apparatus according to one aspect includes an image capturing unit that generates an image by capturing an image of a subject; and a controlling unit that executes either of processes based on the aforementioned image processing program, in which the controlling unit obtains a plurality of images generated by the image capturing unit as the plurality of images in the obtaining step.

A storage medium according to another aspect is the storage medium storing an image processing program causing a computer to execute image processing which generates, from a plurality of images having a positional displacement, a composite image having a higher resolution than the plurality of images, the image processing program including an obtaining step obtaining the plurality of images; an interpolating step performing alignment of the plurality of images and generating an interpolated image through interpolation processing based on the plurality of images; a determination step determining an accuracy of the alignment; a decision step deciding, based on the accuracy, a weighting at a time of combining the interpolated image and at least one image among the plurality of images; and a combining step generating, through an optimization method in accordance with the weighting, the composite image by combining the interpolated image and at least one image among the plurality of images.

Note that in the determination step, the accuracy may also be determined based on at least either an alignment accuracy for each of areas as a result of dividing the plurality of images into a predetermined number of areas or an alignment accuracy for each of pixels included in the plurality of images.

Further, it is also possible that, in the decision step, weighting information indicating a distribution of the weighting in the combining step is calculated based on the accuracy, and in the combining step, the composite image is generated in accordance with the weighting information.

An image processing apparatus according to another aspect includes a controlling unit that executes processes based on the aforementioned image processing program.

An imaging apparatus according to another aspect includes an image capturing unit that generates an image by capturing an image of a subject; and the aforementioned image processing apparatus, in which the controlling unit obtains a plurality of images generated by the image capturing unit as the plurality of images in the obtaining step.

DETAILED DESCRIPTION OF THE EMBODIMENT

Hereinafter, embodiments will be described using the drawings. Description will be made hereinbelow by citing a computer as an example.

Figure 1:
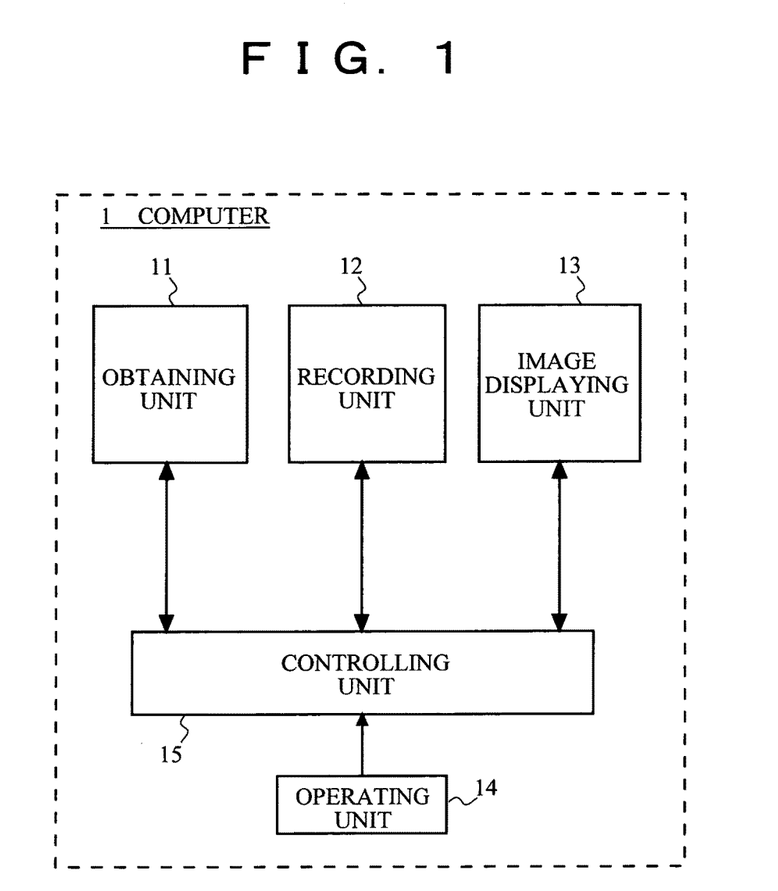
FIG. 1 is a view illustrating a configuration of a computer 1 of an embodiment.

FIG. 1 is a view illustrating a configuration of a computer 1 of an embodiment. As illustrated in FIG. 1, the computer 1 includes an obtaining unit 11, a recording unit 12, an image displaying unit 13, an operating unit 14, and a controlling unit 15. The obtaining unit 11 obtains image data from an external device such as an electronic camera and a recording medium via a wired or wireless recording medium drive or the like. The recording unit 12 records image data and the like. The image displaying unit 13 includes an image-display element such as a liquid crystal display element. The operating unit 14 includes a power button, a mouse, a keyboard, and the like. The controlling unit 15 comprehensively controls the respective units. Further, the controlling unit 15 previously records a program for executing respective processings. Note that the program may also be one obtained through wired or wireless internet, or one obtained through a recording medium or the like.

The controlling unit 15 performs image processing for generating, from a plurality of images having a positional displacement, a composite image having a higher resolution than those images, on images obtained by the obtaining unit 11 and images recorded in the recording unit 12.

An operation of the controlling unit 15 at the time of executing such image processing will be described with reference to a flow chart in FIG. 2.

In step S1, the controlling unit 15 obtains, in accordance with an instruction from a user through the operating unit 14, a plurality of low-resolution images to be processing targets and positional displacement information.

The positional displacement information is a function represented by a(x), and exists for each of a plurality of color components (R, G, B, for instance) that form the aforementioned low-resolution image. The positional displacement information a(x) is previously determined by a predetermined method. As a method for determining the positional displacement information a(x), there are methods such as a template matching method and a Lucas-Kanade method, for example. Further, the positional displacement information a(x) includes, for instance, a coordinate value corresponding to a size of a finally generated composite image. The positional displacement information a(x) may also be recorded as tag information of the aforementioned plurality of images, or may also be recorded as information of another file associated with the plurality of images.

In step S2, the controlling unit 15 reads pixel values of pixels and positional displacement information included in a local area in the processing target. The local area is a previously set predetermined area, and has a size of about 5 pixels square, for example. The controlling unit 15 performs processing on all of pixels while sequentially shifting the local area (refer to later-described step S5).

In step S3, the controlling unit 15 generates weighting data based on the positional displacement information read in step S2. The weighting data is formed of Wd regarding a color difference component and Wx regarding a distance component.

The weighting data Wd is determined based on a predetermined reference value. The reference value is, when an initial image is simply enlarged to a size of a finally generated composite image using a bi-cubic interpolation, a bi-linear interpolation or the like, a pixel value at coordinates corresponding to those of the enlarged image, for example. The weighting data Wd is determined by using a Gaussian or linear function. When the Gaussian function is employed, the data is determined through an equation 1 described below, and when the linear function is employed, the data is determined through an equation 2 described below.

$$Wd = \exp\left(-\frac{(I(x)-T(x))^2}{2\delta^2}\right) \quad \text{Equation 1}$$

$$Wd = 1/|I(x)-T(x)| \quad \text{Equation 2}$$

Further, the weighting data Wx is determined based on predetermined reference coordinates. The reference coordinates are coordinates of pixel being coordinates of calculation target. Similar to the weighting data Wd, the weighting data Wx is also determined by using the Gaussian or linear function. When the Gaussian function is employed, the data is determined through an equation 3 described below, and when the linear function is employed, the data is determined through an equation 4 described below.

$$Wx = \exp\left(-\frac{(x)^2}{2\delta^2}\right) \quad \text{Equation 3}$$

$$Wx = 1/|x| \quad \text{Equation 4}$$

The controlling unit 15 sets $a(x) \cdot Wd \cdot Wx$ as a result of multiplying the positional displacement information a(x) described in step S1 and the aforementioned weighting data Wd and weighting data Wx, as final weighting data, and the process proceeds to step S4.

In step S4, the controlling unit 15 calculates a weighting average value based on the weighting data $a(x) \cdot Wd \cdot Wx$ generated in step S3. The weighting average value b(x) is determined through an equation 5 described below.

$$b(x) = \int a(x) \cdot Wd \cdot Wx \cdot I(x) \cdot dx \quad \text{Equation 5}$$

Note that the controlling unit 15 performs the respective processings described in step S2 to step S4 for each of a plurality of color components (R, G, B, for instance) that form the aforementioned low-resolution image (refer to later-described step S6).

In step S5, the controlling unit 15 determines whether or not the processings of step S2 to step S4 are performed on all of the pixels. When the controlling unit 15 determines that the processings of step S2 to step S4 are performed on all of the pixels, the process proceeds to step S6. Meanwhile, when it is determined that the processings of step S2 to step S4 are not performed on all of the pixels, the controlling unit 15 sets the following local area as a processing target, and the process returns to step S2.

In step S6, the controlling unit 15 determines whether or not the processings of step S2 to step S4 are performed on all of the color components. When the controlling unit 15 determines that the processings of step S2 to step S4 are performed on all of the color components, the process proceeds to step S7. Meanwhile, when it is determined that the processings of step S2 to step S4 are not performed on all of the color components, the controlling unit 15 sets the following color component as a processing target, and the process returns to step S2.

In step S7, the controlling unit 15 performs combining processing. The controlling unit 15 performs the combining processing with the use of an equation 6 to an equation 8 described below, based on the weighting average value for each of the plurality of color components calculated in step S4.

$$Ig = \int (a(x) \cdot Wd \cdot Wx \cdot (Ig(x) - Ib,r(x)) \cdot dx) + Ib,r \qquad \text{Equation 6}$$

$$Ib = \int (a(x) \cdot Wd \cdot Wx \cdot (Ib(x) - Ig(x)) \cdot dx) + Ig \qquad \text{Equation 7}$$

$$Ir = \int (a(x) \cdot Wd \cdot Wx \cdot (Ir(x) - Ig(x)) \cdot dx) + Ig \qquad \text{Equation 8}$$

In the equation 6, Ib,r indicates a value of either R component or B component, among the plurality of color components, or a value obtained by averaging the R component and the B component.

By performing the combining processing by sequentially conducting the processings of the equation 6 to the equation 8, inflection information is calculated using the weighting average values of all of the color components, thereby again estimating (interpolating) a pixel value. Specifically, the combining processing of G component is performed using inflection information of the B component or the R component, and then the combining processing of the B component and the R component is performed using inflection information of the G component on which the combining processing is performed. Here, the inflection information is information of color component other than the color component of processing target.

Note that the aforementioned equation 6 to equation 8 are examples, and it is also possible to employ other equations as long as the inflection information of color component other than the color component of processing target is used. For instance, it is also possible to replace the aforementioned equation 7 and equation 8 with an equation 9 and an equation 10 described below, respectively.

$$Ib = \int (a(x) \cdot Wd \cdot Wx \cdot (Ib(x) - Ir(x)) \cdot dx) + Ir \qquad \text{Equation 9}$$

$$Ir = \int (a(x) \cdot Wd \cdot Wx \cdot (Ir(x) - Ib(x)) \cdot dx) + Ib \qquad \text{Equation 10}$$

In step S8, the controlling unit 15 determines whether or not the combining processing described in step S7 is performed on all of the pixels. When the controlling unit 15 determines that the combining processing described in step S7 is performed on all of the pixels, the process proceeds to step S9. Meanwhile, when it is determined that the combining processing described in step S7 is not performed on all of the pixels, the controlling unit 15 sets the following pixel as a processing target, and the process returns to step S7.

In step S9, the controlling unit 15 determines whether or not the combining processing described in step S7 is performed on all of the color components. When the controlling unit 15 determines that the combining processing described in step S7 is performed on all of the color components, the process proceeds to step S10. Meanwhile, when it is determined that the combining processing described in step S7 is not performed on all of the color components, the controlling unit 15 sets the following color component as a processing target, and the process returns to step S7.

In step S10, the controlling unit 15 records image data of an image on which the image processing is performed in step S7, in the recording unit 12, and terminates a series of processings. Note that, according to need, the controlling unit 15 may also perform compression processing on the composite image which is not yet recorded.

Figure 2:
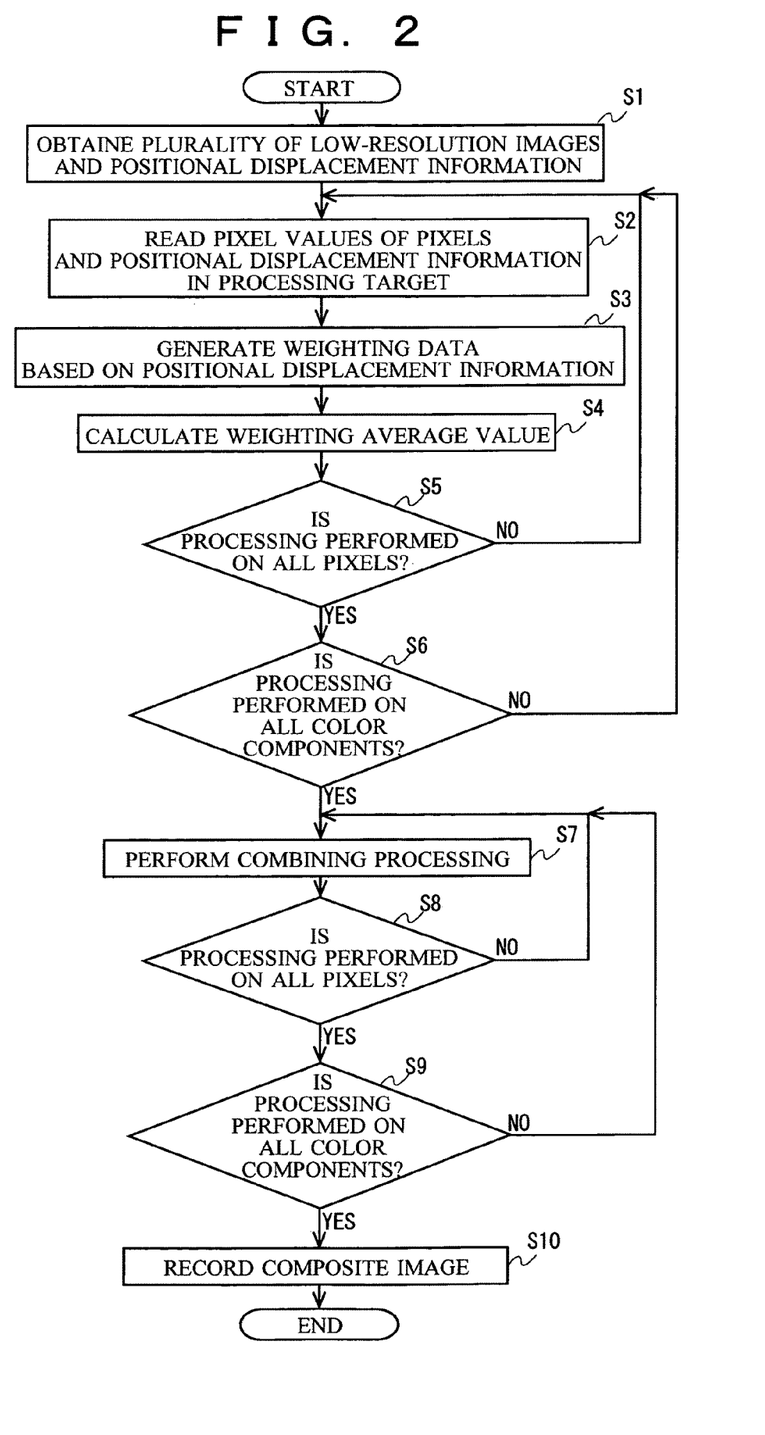
FIG. 2 is a flow chart explaining an operation of a controlling unit 15 at a time of executing image processing in the embodiment.

By performing the series of processings described using the flow chart in FIG. 2, a more accurate pixel value can be estimated. Accordingly, without performing processing that requires a processing time such as repeating processing, it is possible to suppress an occurrence of false color in the composite image, and to generate an image in which a sampling density indicating an amount of information, and sharpness are high.

Further, by using the composite image generated as above as an initial image for another processing, it can be expected to improve the quality of the processed image. For example, by using the composite image generated as above as an initial image for super-resolution processing with the use of repeating calculation processing, it is possible to generate an image with higher resolution.

Figure 3:
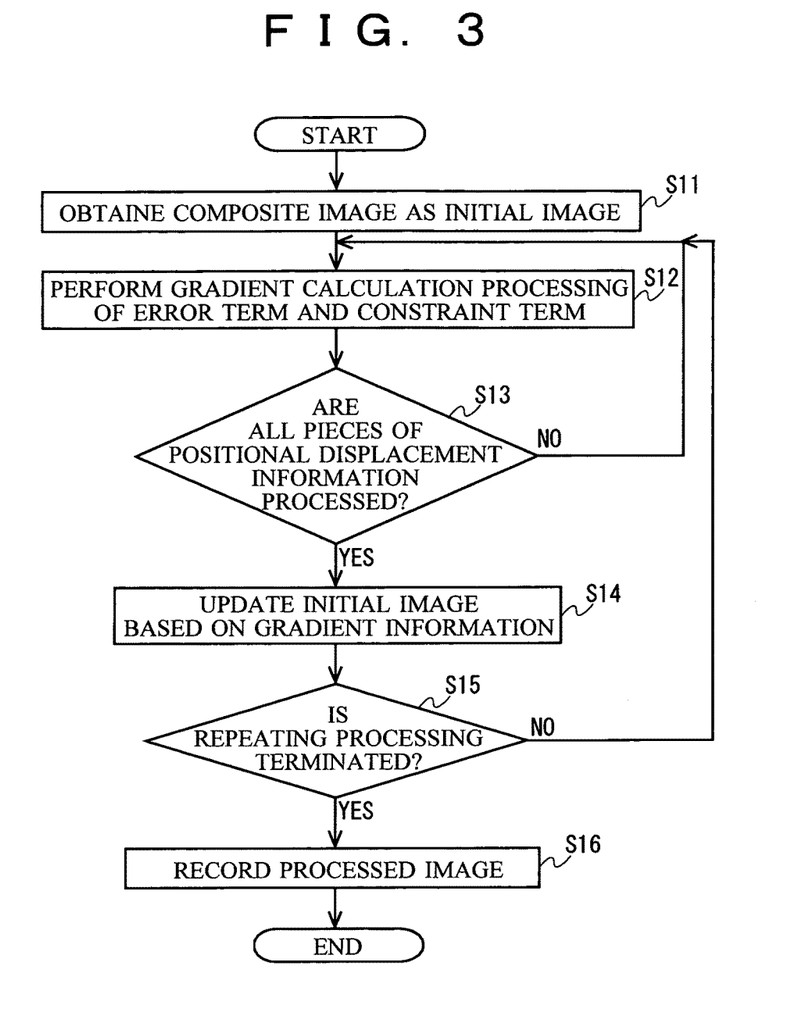
FIG. 3 is another flow chart explaining an operation of the controlling unit 15 at the time of executing the image processing in the embodiment.

An operation of the controlling unit 15 when the super-resolution processing with the use of the repeating calculation processing is carried out by using the composite image generated through the series of processings in FIG. 2 as the initial image, will be described with reference to a flow chart in FIG. 3. Note that although description will be made hereinbelow by citing super-resolution processing using MAP-type repeating calculation as an example, the present application is not limited to this example, and it is also possible to conduct the super-resolution processing using another method. Further, functional forms and the number of terms of error terms and constraint terms in the following processing are examples.

In step S11, the controlling unit 15 obtains the composite image as an initial image.

In step S12, the controlling unit 15 performs gradient calculation processing of an error term and a constraint term.

An equation 11 described below is an evaluation function assumed based on a camera model. By minimizing the evaluation function using the repeating processing, an intended high-resolution image is obtained.

$$\epsilon = \Sigma |PSF \cdot X - Y|^2 + |\Lambda \cdot X|^2 \qquad \text{Equation 11}$$

In the equation 11, X indicates an unknown high-resolution image, and Y indicates alignment data. In the MAP method, by minimizing a function $\epsilon$ represented by the equation 11, the unknown high-resolution image is obtained. Note that in the equation 11, a first term on the right side corresponds to an error term, and a second term on the right side corresponds to a constraint term. Further, as a method of minimizing the function $\epsilon$, the controlling unit 15 employs a conjugate gradient method or a steepest descent method. A gradient for performing the minimization is represented by the following equation 12.

$$\frac{\partial \varepsilon}{\partial X} = \sum 2 \cdot PSF \cdot (PSF^T \cdot X - Y) + 2\alpha \cdot \Lambda \cdot (\Lambda^T \cdot X) \quad \text{Equation 12}$$

The controlling unit 15 uses the composite image obtained in step S11 as X in the equation 12. However, if the processing in step S12 is conducted after the determination is made as NO in later-described step S15, the controlling unit 15 uses an initial image updated in later-described step S14 as X in the equation 12.

In step S13, the controlling unit 15 determines whether or not all the pieces of positional displacement information are processed. When the controlling unit 15 determines that all the pieces of positional displacement information are processed, the process proceeds to step S14. Meanwhile, when it is determined that all the pieces of positional displacement information are not processed, the controlling unit 15 sets the following positional displacement information as a processing target, and the process returns to step S12.

In step S14, the controlling unit 15 updates the initial image in step S11 based on gradient information.

In step S15, the controlling unit 15 determines whether or not the repeating processing is terminated. When the controlling unit 15 determines that the repeating processing is terminated, the process proceeds to step S16. Meanwhile, when it is determined that the repeating processing is not terminated, the process returns to step S12. However, in the following processing, the controlling unit 15 performs the processing by setting the initial image updated in step S14 as a target. Note that the determination whether or not the repeating processing is terminated is made in accordance with previously set conditions. The controlling unit 15 performs the determination whether or not the repeating processing is terminated, in accordance with conditions such as the number of times of processing and a comparison between a predetermined evaluation value and threshold value, for example.

In step S16, the controlling unit 15 records image data of an image updated at last in step S14, in the recording unit 12, and terminates the series of processings. Note that, according to need, the controlling unit 15 may also perform compression processing on the composite image which is not yet recorded.

In the super-resolution processing, a processing result depends on the initial image used for the repeating processing. Specifically, the super-resolution processing has an initial image dependence indicating that the better the image quality of the initial image, the better the result obtained through the repeating processing. By conducting the series of processings described using the flow chart in FIG. 3 by using the composite image described in the flow chart in FIG. 2 as the initial image, in a high-resolution image generated through the super-resolution processing, an artifact is removed and an occurrence of false color can be suppressed, and it is possible to generate an image in which a sampling density indicating an amount of information, and sharpness are high.

As described above, according to the present embodiment, the plurality of images and the positional displacement information indicating the positional displacement between those images are obtained, and the weighting information for performing the weighting processing on the positional displacement information is calculated for each of the plurality of color components. Further, the weighting processing based on the weighting information is performed on the positional displacement information, for each of the plurality of color components, and, based on the local inflection information of the color component other than the color component of the calculation target among the plurality of color components and the weighting information after conducting the weighting processing, the pixel value of the color component of the calculation target is calculated, thereby generating the composite image based on the calculation result. Accordingly, without performing processing that requires a processing time such as the repeating processing, it is possible to suppress the occurrence of false color in the composite image, and to generate an image in which a sampling density indicating an amount of information, and sharpness are high. Therefore, in the image processing for generating, from a plurality of images having a positional displacement, a composite image having a higher resolution than those images, it is possible to reduce a processing time compared to a case of performing repeating processing.

Further, according to the present embodiment, the super-resolution processing that performs the predetermined repeating calculation is conducted by using the aforementioned composite image as the initial image, thereby generating an image having a higher definition than the composite image. Accordingly, in a high-resolution image generated through the super-resolution processing, an artifact is removed and an occurrence of false color can be suppressed, and it is possible to generate an image in which a sampling density indicating an amount of information, and sharpness are high.

In particular, according to the present embodiment, when the super-resolution processing is performed by using a so-called Bayer image as an initial image, it is possible to synthesize an interpolated image with appropriate alignment data regarding the Bayer image to be the initial image for the repeating processing.

Further, with the use of the method of the present embodiment, it is also possible to appropriately deal with a case in which, when the super-resolution processing is conducted, the repeating processing is performed based on a result of alignment of irregular patterns, namely, random patterns.

Note that in the present embodiment, the plurality of low-resolution images obtained in step S1 in the flow chart in FIG. 2 can be any image. For instance, it is also possible to obtain a plurality of images in Bayer arrangement or a plurality of interpolation-processed images.

Further, although the present embodiment describes the example in which, when the weighting data is generated in step S3 in the flow chart in FIG. 2, both Wd regarding the color difference component and Wx regarding the distance component are calculated, it is also possible to structure such that only either Wd or Wx is calculated.

Next, another embodiment will be descried using the drawings. Hereinafter, description will be made by citing a computer as an example. The computer of the present embodiment has a similar configuration to that of the computer described in FIG. 1, so that description of configuration will be omitted, and description will be made using the same reference numerals as those in the example in FIG. 1.

In the present embodiment, the controlling unit 15 performs image processing for generating, from a plurality of images having a positional displacement, a composite image having a higher resolution than those images, on images obtained by the obtaining unit 11 and images recorded in the recording unit 12.

An operation of the controlling unit 15 at the time of executing such image processing will be described with reference to flow charts in FIG. 4 to FIG. 7 and a schematic diagram in FIG. 8.

Figure 4:
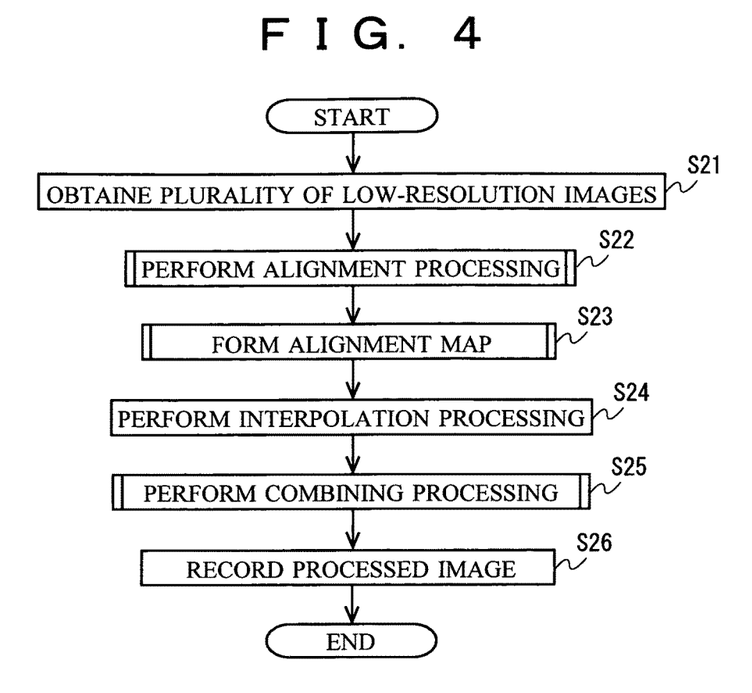
FIG. 4 is a flow chart explaining an operation of a controlling unit 15 at a time of executing image processing in another embodiment.

FIG. 4 is a flow chart illustrating a flow of the entire processing.

In step S21, the controlling unit 15 obtains, in accordance with an instruction from a user through the operating unit 14, a plurality of low-resolution images to be processing targets. Note that the plurality of low-resolution images to be the processing targets can also be moving images (including compressed and uncompressed moving images), still images, or both the moving images and the still images, as long as they are a plurality of images obtained by capturing an image of substantially the same subject and having a positional displacement. Further, a format of the various images can also be any format (RAW format or the like, for example).

In step S22, the controlling unit 15 performs alignment processing between a low-resolution image to be a reference (referred to as "reference image", hereinafter) and another low-resolution image, among the plurality of low-resolution images obtained in step S21. Details of the alignment processing will be described later.

In step S23, the controlling unit 15 forms an alignment map based on a result of the alignment processing performed in step S22. The alignment map is information indicating a distribution of weighting at a time of later-described combining processing based on the accuracy of alignment described above. Details regarding the formation of alignment map will be described later.

In step S24, the controlling unit 15 performs interpolation processing on the plurality of low-resolution images obtained in step S21 based on the result of the alignment processing performed in step S22, thereby generating an interpolated image. The interpolation processing can also be performed by using any publicly known method.

Note that, through the interpolation processing, the interpolated image has the number of pixels larger than that of the plurality of low-resolution images obtained in step S21. For this reason, a size of the interpolated image becomes larger than that of the plurality of low-resolution images obtained in step S21.

In step S25, the controlling unit 15 performs, based on the alignment map formed in step S23, combining processing on the reference image in the alignment processing performed in step S22 and the interpolated image generated in step S24. The combining processing is super-resolution processing that performs predetermined repeating calculation. Details of the combining processing will be described later.

In step S26, the controlling unit 15 records image data of a composite image generated through the combining processing in step S25, in the recording unit 12, and terminates a series of processings. Note that, according to need, the controlling unit 15 may also perform compression processing on the composite image which is not yet recorded.

Figure 5:
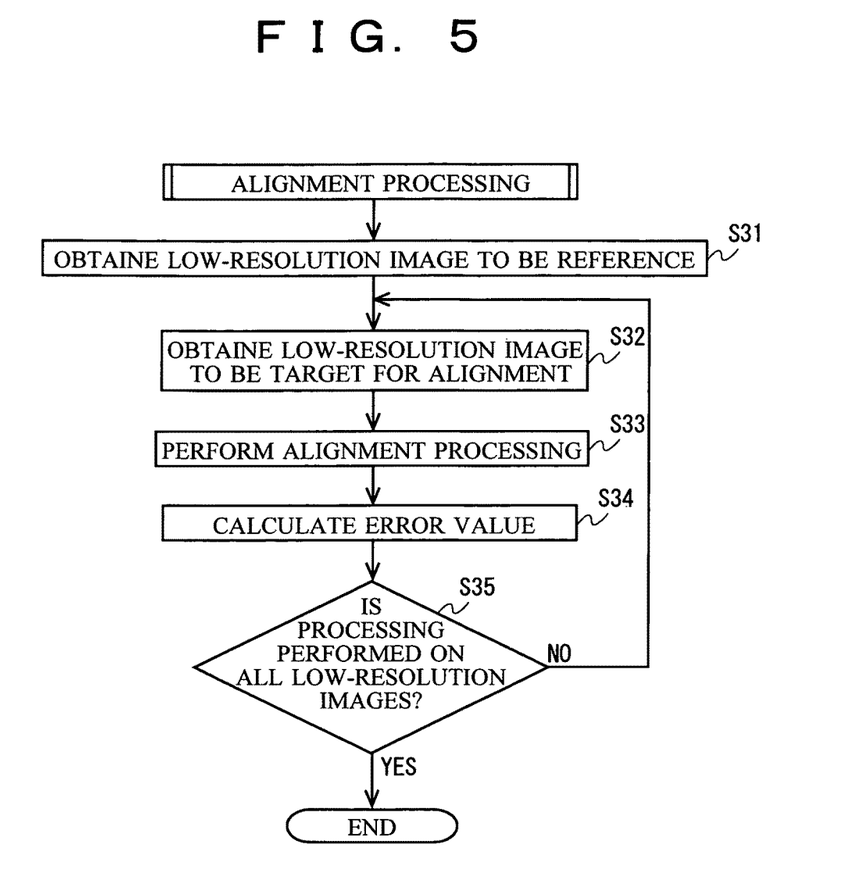
FIG. 5 is another flow chart explaining an operation of the controlling unit 15 at the time of executing the image processing in another embodiment.

FIG. 5 is a flow chart illustrating details of the alignment processing described in step S22 in the flow chart in FIG. 4.

In step S31, the controlling unit 15 obtains the low-resolution image to be a reference for the alignment (above-described reference image).

In step S32, the controlling unit 15 obtains the low-resolution image to be a target for the alignment.

In step S33, the controlling unit 15 performs the alignment processing. The alignment processing can also be performed by using any publicly known method (Lucas-Kanade method, HS method, Block Matching method or the like, for example). For instance, the controlling unit 15 divides each of the reference image and the low-resolution image to be the target for the alignment into predetermined areas, and determines a difference value of pixel values for each of the divided areas, thereby conducting the alignment processing. Further, it is also possible that the controlling unit 15 performs the alignment processing with the use of a method using feature points. Further, it is also possible that the alignment processing is performed through multi-resolution processing.

In step S34, the controlling unit 15 calculates an error value based on the result of the alignment processing performed in step S33. The error value is a value indicating the accuracy of alignment in step S33, and is calculated for each pixel.

The controlling unit 15 first determines, for each of the aforementioned areas, an error value Eb at area level based on a difference value between pixels included in the areas. Further, an error value Ep at pixel level is determined based on a difference value between pixels. Note that when the error value is determined from the difference value, a cumulative value or an average value is calculated, for example. Further, an error value E of an arbitrary pixel is calculated using the following equation.

$$E = Eb \times Ep \qquad \text{Equation 13}$$

Note that the method is an example, and it is also possible that only the error value Eb at area level is used, or only the error value Ep at pixel level is used. Further, it is also possible that weighting addition is performed on both the error value Eb at area level and the error value Ep at pixel level, and the resultant is set as the error value E.

In step S35, the controlling unit 15 determines whether or not the alignment processing is performed on all of the plurality of low-resolution images obtained in step S21 in the flow chart in FIG. 4. When the controlling unit 15 determines that the alignment processing is performed on all of the low-resolution images, it terminates the alignment processing, and the process proceeds to step S23 in the flow chart in FIG. 4. Meanwhile, when it is determined that the alignment processing is not performed on all of the low-resolution images, the controlling unit 15 sets the following low-resolution image as a processing target, and the process returns to step S32.

Figure 6:
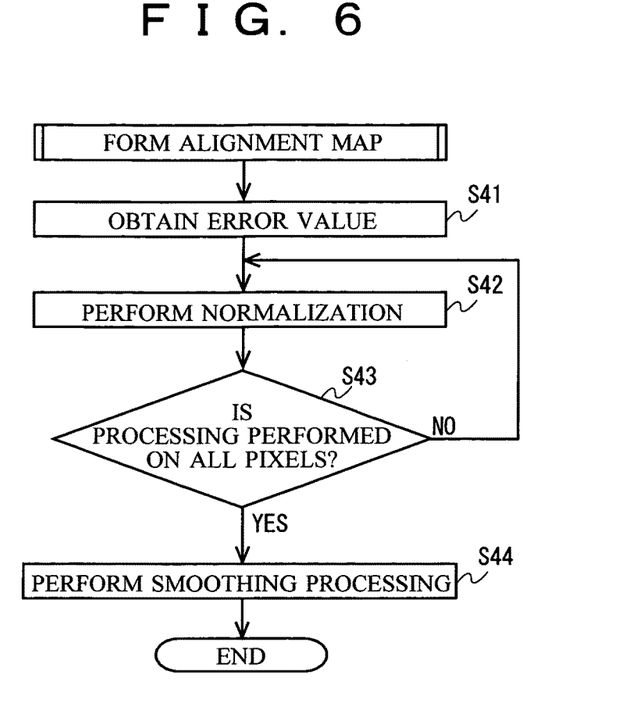
FIG. 6 is another flow chart explaining an operation of the controlling unit 15 at the time of executing the image processing in another embodiment.

FIG. 6 is a flow chart illustrating details of the formation of alignment map described in step S23 in the flow chart in FIG. 4. As described above, the alignment map is information indicating the distribution of weighting at the time of combining processing. The controlling unit 15 forms the alignment map by mapping the error values calculated in the alignment processing described in the flow chart in FIG. 5, onto a scale of the interpolated image described in the flow chart in FIG. 4.

In step S41, the controlling unit 15 obtains the error value calculated in step S34 in the flow chart in FIG. 5.

In step S42, the controlling unit 15 normalizes the error value E obtained in step S41. The controlling unit 15 multiplies the error value E by a normalization coefficient, to thereby normalize the error value E so that it falls within a value of 0 to 1. Note that when the error value exceeds 1 even after being multiplied by the normalization coefficient, the controlling unit 15 replaces the value with 1.

In step S43, the controlling unit 15 determines whether or not the normalization described in step S42 is performed on all of the pixels. When the controlling unit 15 determines that the normalization is performed on all of the pixels, the process proceeds to step S44. Meanwhile, when it is determined that the normalization is not performed on all of the pixels, the controlling unit 15 sets the following area as a processing target, and the process returns to step S42.

In step S44, the controlling unit 15 performs smoothing processing on the error value normalized in step S42, and the process proceeds to step S24 in the flow chart in FIG. 4. By performing the smoothing processing, the weighting based on the alignment map varies smoothly.

Note that it is also possible to perform the smoothing processing before the normalization described in step S42. Specifically, it is also possible that the normalization is performed on the obtained error value after performing the smoothing processing on the value.

Further, it is also possible to omit the smoothing processing. As described in step S34 in FIG. 5, the error value E is calculated based on the error value Eb at area level and the error value Ep at pixel level. By using the error value Eb at area level, the error value varies somewhat smoothly without performing the smoothing processing.

Figure 7:
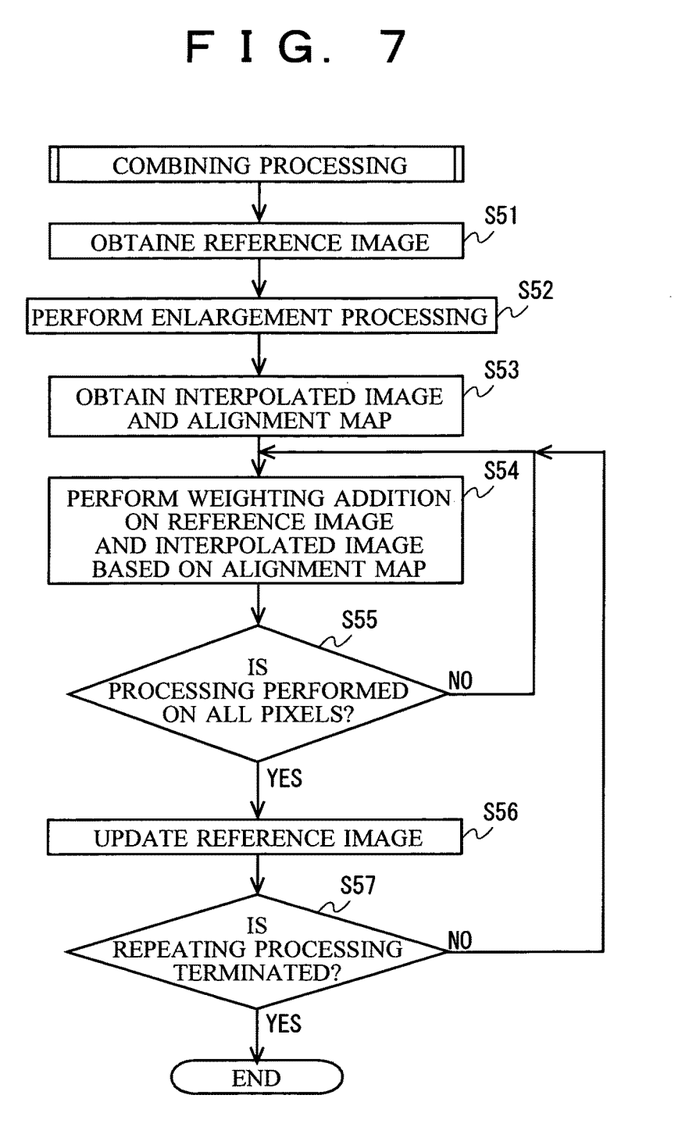
FIG. 7 is another flow chart explaining an operation of the controlling unit 15 at the time of executing the image processing in another embodiment.

FIG. 7 is a flow chart illustrating details of the combining processing described in step S25 in the flow chart in FIG. 4.

In step S51, the controlling unit 15 obtains the reference image (refer to step S22 in the flow chart in FIG. 4).

In step S52, the controlling unit 15 performs enlargement processing on the reference image obtained in step S51. As described in step S24 in the flow chart in FIG. 4, the interpolated image has a size larger than that of the plurality of low-resolution images (including the reference image) obtained in step S21. Accordingly, there is a need to match the sizes of those images when the combining processing of the reference image and the interpolated image is performed in later-described step S54. Therefore, the controlling unit 15 performs the enlargement processing on the reference image so that the image is enlarged to the same size as that of the interpolated image.

In step S53, the controlling unit 15 obtains the interpolated image (refer to step S24 in the flow chart in FIG. 4) and the alignment map (refer to the flow chart in FIG. 6).

In step S54, the controlling unit 15 performs weighting addition on the reference image and the interpolated image in accordance with the alignment map. Image data D as a result of performing the weighting addition is determined using the following equation.

$$D = \text{image data of interpolated image} \times (1 \times E) + \text{image data of reference image} \times E \quad \text{Equation 14}$$

The controlling unit 15 performs the weighting addition for each pixel in accordance with the aforementioned equation 14.

In step S55, the controlling unit 15 determines whether or not the weighting addition processing described in step S54 is performed on all of the pixels. When the controlling unit 15 determines that the processing is performed on all of the pixels, the process proceeds to step S56. Meanwhile, when it is determined that the processing is not performed on all of the pixels, the controlling unit 15 sets the following pixel as a processing target, and the process returns to step S54.

In step S56, the controlling unit 15 updates the reference image obtained in step S51.

In step S57, the controlling unit 15 determines whether or not the repeating processing is terminated. When the controlling unit 15 determines that the repeating processing is terminated, the process proceeds to step S26 in the flow chart in FIG. 4. Meanwhile, when it is determined that the repeating processing is not terminated, the process returns to step S54. However, in the following processing, the controlling unit 15 performs the processing by setting the reference image updated in step S56 as a target. Note that the determination whether or not the repeating processing is terminated is made in accordance with previously set conditions. The controlling unit 15 performs the determination whether or not the repeating processing is terminated, in accordance with conditions such as the number of times of processing and a comparison between a predetermined evaluation value and threshold value, for example.

Note that the combining processing described in FIG. 7 is an example, and the present application is not limited to this example. Any optimization method, other than the aforementioned method, can also be employed. For example, a steepest descent method or a conjugate gradient method can also be applied.

Images and various pieces of information generated at the time of performing the processings in the flow charts in FIG. 4 to FIG. 7 will be described with reference to a schematic diagram in FIG. 8.

Figure 8:
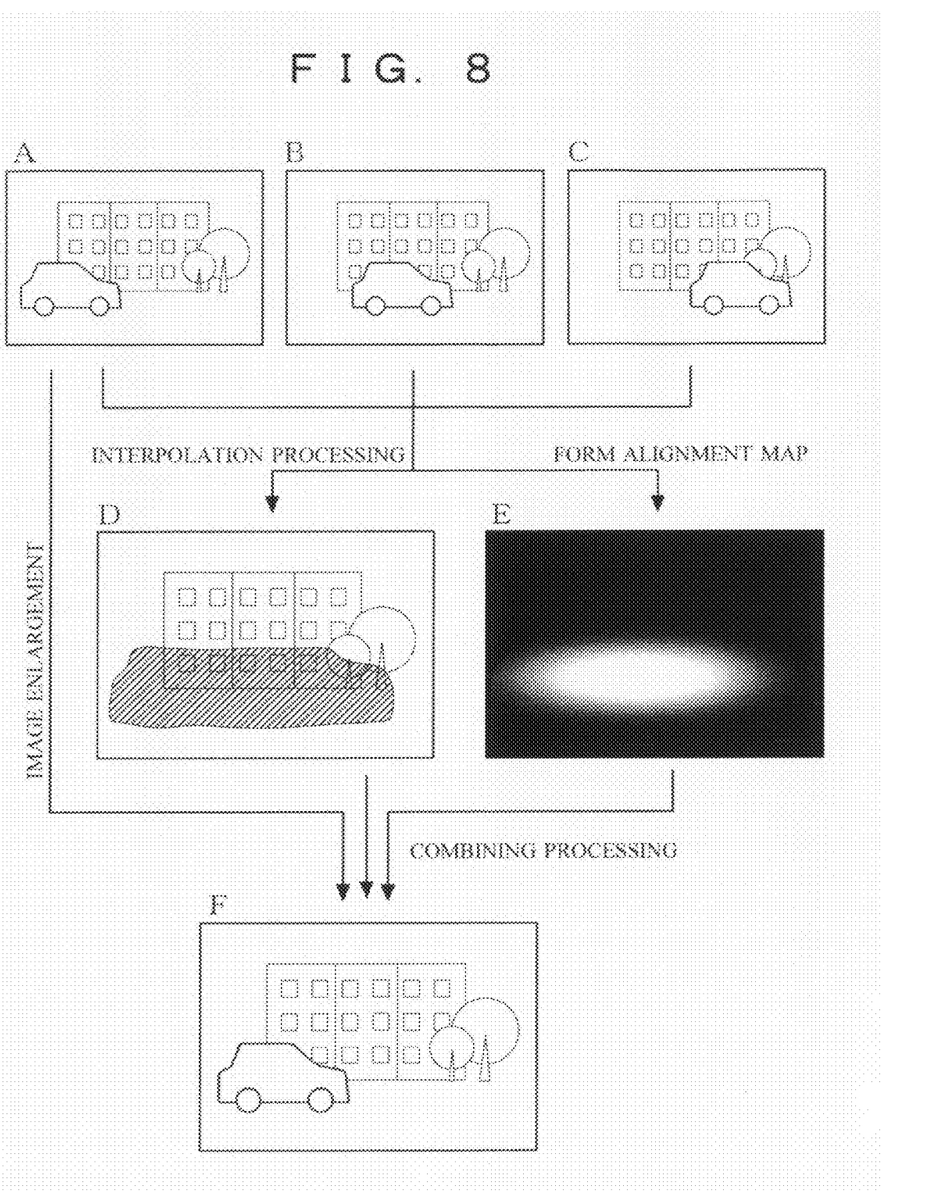
FIG. 8 is a schematic diagram explaining a flow of the image processing in another embodiment.

For example, it is assumed that a plurality of low-resolution images represented by the illustrations A to C in FIG. 8 are obtained in step S21 in the flow chart in FIG. 4. The images in the illustrations A to C in FIG. 8 are a plurality of images, in each of which there are a building in the background and a car moving across in front of the building from left to right. An image generated through the processings in step S22 and step S24 in the flow chart in FIG. 4 by using, among these images, the image in the illustration A in FIG. 8 as a reference image, is an interpolated image in the illustration D in FIG. 8. As represented by the illustration D in FIG. 8, the interpolated image has a larger size than the reference image, and further, since the alignment is not performed correctly on a portion of the car being a moving body, the portion is missing in the image.

Further, one that is formed through the processing in step S23 in the flow chart in FIG. 4 is an alignment map in the illustration E in FIG. 8. In the alignment map, the larger the error value E is, the more white it is expressed, and the smaller the error value E is, the more black it is expressed, as represented by the illustration E in FIG. 8. A white portion (portion with large error value) in the illustration E in FIG. 8 corresponds to the portion of the car being the moving body, and a black portion (portion with small error value) in the illustration E in FIG. 8 corresponds to the portion of the building and the like being stationary bodies.

Further, one that is generated through the processing in step S25 in the flow chart in FIG. 4 is a composite image in the illustration F in FIG. 8. As represented by the illustration F in FIG. 8, the high-resolution is performed on the portion of the building being the stationary body with the use of the interpolated image (illustration D in FIG. 8), and the portion of the car being the moving body is not missing with the use of the reference image.

As described above, according to the present embodiment, the plurality of images having the positional displacement are obtained to perform the alignment, and the interpolated image is generated through the interpolation processing. Further, the accuracy of the alignment is determined, and, based on the determined accuracy, the weighting at the time of combining at least one image among the plurality of images and the interpolated image is decided. Further, through the optimization method in accordance with the decided weighting, the at least one image among the plurality of images and the interpolated image are synthesized, to thereby generate the composite image. Accordingly, when a moving body and a stationary body are included in a field, it is possible to reflect more information of an image to be a target for the alignment obtained at an early stage in a portion of the moving body, and to reflect more information of an interpolated image in a portion of the stationary body. Therefore, in the image processing for generating, from a plurality of images having a positional displacement, a composite image having a higher resolution than those images, it is possible to generate a preferable composite image even when a moving body and a stationary body are included in a field.

Note that in the present embodiment, the plurality of low-resolution images obtained in step S21 in the flow chart in FIG. 4 can be any image. For instance, it is also possible to obtain a plurality of images in Bayer arrangement or a plurality of interpolation-processed images.

Further, in the present embodiment, description is made by citing a case in which a still image is generated as the composite image as an example, but, the present application can also be similarly applied to a case in which a moving image is generated as the composite image.

Further, the alignment map described in the present embodiment can also be utilized for a purpose other than the combining processing described in the present embodiment. For instance, the map can also be utilized for moving body extraction processing and the like.

Note that in the respective embodiments described above, description is made by citing the computer as an example, but, the present application is not limited to this example. For instance, an imaging apparatus such as an electronic camera that executes processings based on the programs described in the aforementioned respective embodiments is also useful as a concrete aspect of the present application.

Figure 9:
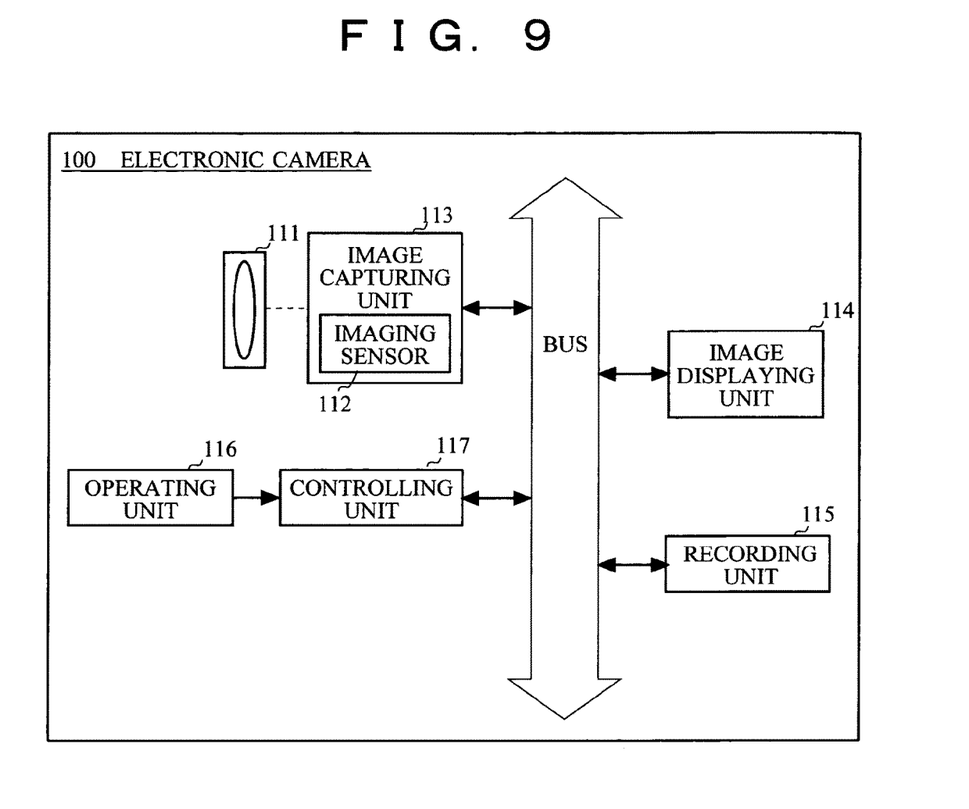
FIG. 9 is a block diagram illustrating a configuration of an electronic camera 100 being an example of an imaging apparatus of an embodiment.

FIG. 9 is a block diagram illustrating a configuration of an electronic camera 100 being an example of such an imaging apparatus.

As illustrated in FIG. 9, the electronic camera 100 includes a photographic lens 111; an image capturing unit 113 including an imaging sensor 112 such as a CCD; an image displaying unit 114 provided with a liquid crystal monitor that displays an image, and the like; a recording unit 115 formed of a recording medium that records an image, and the like; an operating unit 116 having a not-illustrated release button and the like and accepting an operation of a user; and a controlling unit 117 controlling the respective units. The image capturing unit 113, the recording unit 115, and the controlling unit 117 are mutually connected via a bus. Further, an output of the controlling unit 117 is also connected to the image displaying unit 114 via the bus. Further, an output of the operating unit 116 is connected to the controlling unit 117.

The controlling unit 117 records a program for conducting the processings described in step S2 to step S10, after obtaining images (including moving images and still images) generated by the image capturing unit 113 and images (including moving images and still images) recorded in the recording unit 115, as the plurality of low-resolution images in step S1 in the flow chart in FIG. 2 of the above-described embodiment, and appropriately calculating the positional displacement information described in step S1.

Further, the controlling unit 117 obtains the images as the plurality of low-resolution images in step S1 in the flow chart in FIG. 2 of the above-described embodiment, and after appropriately calculating the positional displacement information described in step S1, it performs processings similar to those described in step S2 to step S10. Further, the controlling unit 117 performs processings similar to those described in step S11 to step S16 in the flow chart in FIG. 3 of the aforementioned embodiment by using a generated composite image as an initial image.

Alternatively, the controlling unit 117 records a program for executing a part or all of the processings described in the flow charts in FIG. 4 to FIG. 7, by obtaining images (including moving images and still images) generated by the image capturing unit 113 and images (including moving images and still images) recorded in the recording unit 115, as the plurality of low-resolution images in step S21 in the flow chart in FIG. 4 of the above-described embodiment.

Further, the controlling unit 117 performs processings similar to those described in the flow charts in FIG. 4 to FIG. 7.

As described above, the imaging apparatus includes the image capturing unit that generates an image by capturing an image of a subject, and the controlling unit that executes the processings based on the image processing programs described in the above-described respective embodiments, and by obtaining the plurality of images generated by the image capturing unit as the plurality of low-resolution images in the aforementioned respective embodiments and performing the similar processings, it is possible to obtain an effect similar to that of the aforementioned respective embodiments.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to the exact construction and operation illustrated and described, and accordingly all suitable modifications and equivalents may be resorted to, falling within the scope thereof.

What is claimed is:

1. A non-transitory computer-readable storage medium storing an image processing program causing a computer to execute image processing which generates, from a plurality of images formed of a plurality of color components and having a positional displacement, a composite image having a higher resolution than the plurality of images, the image processing program comprising:

an obtaining step obtaining the plurality of images and positional displacement information indicating the positional displacement between the plurality of images;

a first calculating step calculating, for each of the plurality of color components, a first weighting information and a second weighting information for performing weighting processing on the positional displacement information, the first weighting information being calculated based on a color difference between a predetermined reference pixel value and an actual pixel value, and the second weighting information being calculated based on a difference between a predetermined reference coordinate value and an actual coordinate value;

a second calculating step performing, for each of the plurality of color components, the weighting processing based on the first and second weighting information on the positional displacement information and calculating a pixel value of a color component of a calculation target based on (1) local inflection information of a color component among the plurality of color components other than the color component of the calculation target and (2) the positional displacement information after conducting the weighting processing; and a generating step generating the composite image based on a calculation result of the second calculating step.

2. The storage medium according to claim 1, wherein
in the obtaining step, a plurality of images in Bayer arrangement are obtained as the plurality of images.

3. The storage medium according to claim 1, wherein
in the obtaining step, a plurality of interpolation-processed images are obtained as the plurality of images.

4. The storage medium according to claim 1, further comprising
a super-resolution processing step performing super-resolution processing which conducts predetermined repeating calculation by using the composite image generated in the generating step as an initial image to generate an image having a higher definition than the composite image.

5. An imaging apparatus, comprising:
an image capturing unit generating an image by capturing an image of a subject; and
a controlling unit executing processes based on the image processing program according to claim 1, wherein
the controlling unit obtains a plurality of images generated by the image capturing unit as the plurality of images in the obtaining step.

6. A non-transitory computer-readable storage medium storing an image processing program causing a computer to execute image processing which generates, from a plurality of images having a positional displacement, a composite image having a higher resolution than the plurality of images, the image processing program comprising:
an obtaining step obtaining the plurality of images;
an interpolating step performing alignment of the plurality of images and generating an interpolated image through interpolation processing based on the plurality of images;
a determination step determining an accuracy of the alignment, the accuracy of the alignment being determined based on at least either (1) an alignment accuracy for each of a plurality of areas formed as a result of dividing the plurality of images into a predetermined number of areas and (2) an alignment accuracy for each of a plurality of pixels included in the plurality of images;
a decision step deciding, based on the accuracy of the alignment, a weighting at a time of combining the interpolated image and at least one image among the plurality of images; and
a combining step generating, through an optimization method in accordance with the weighting, the composite image by combining the interpolated image and at least one image among the plurality of images, wherein
in the decision step, weighting information indicating a distribution of the weighting in the combining step is calculated based on the accuracy of the alignment, and
in the combining step, the composite image is generated in accordance with the weighting information.

7. An image processing apparatus, comprising
a controlling unit executing processes based on the image processing program according to claim 6.

8. An imaging apparatus, comprising:
an image capturing unit generating an image by capturing an image of a subject; and
the image processing apparatus according to claim 7, wherein
the controlling unit obtains a plurality of images generated by the image capturing unit as the plurality of images in the obtaining step.

* * * * *